Jan. 8, 1924.
W. A. MADISON ET AL
1,480,088
ANTIWEAR DEVICE FOR CONTROLLING LEVERS
Filed Feb. 19, 1923
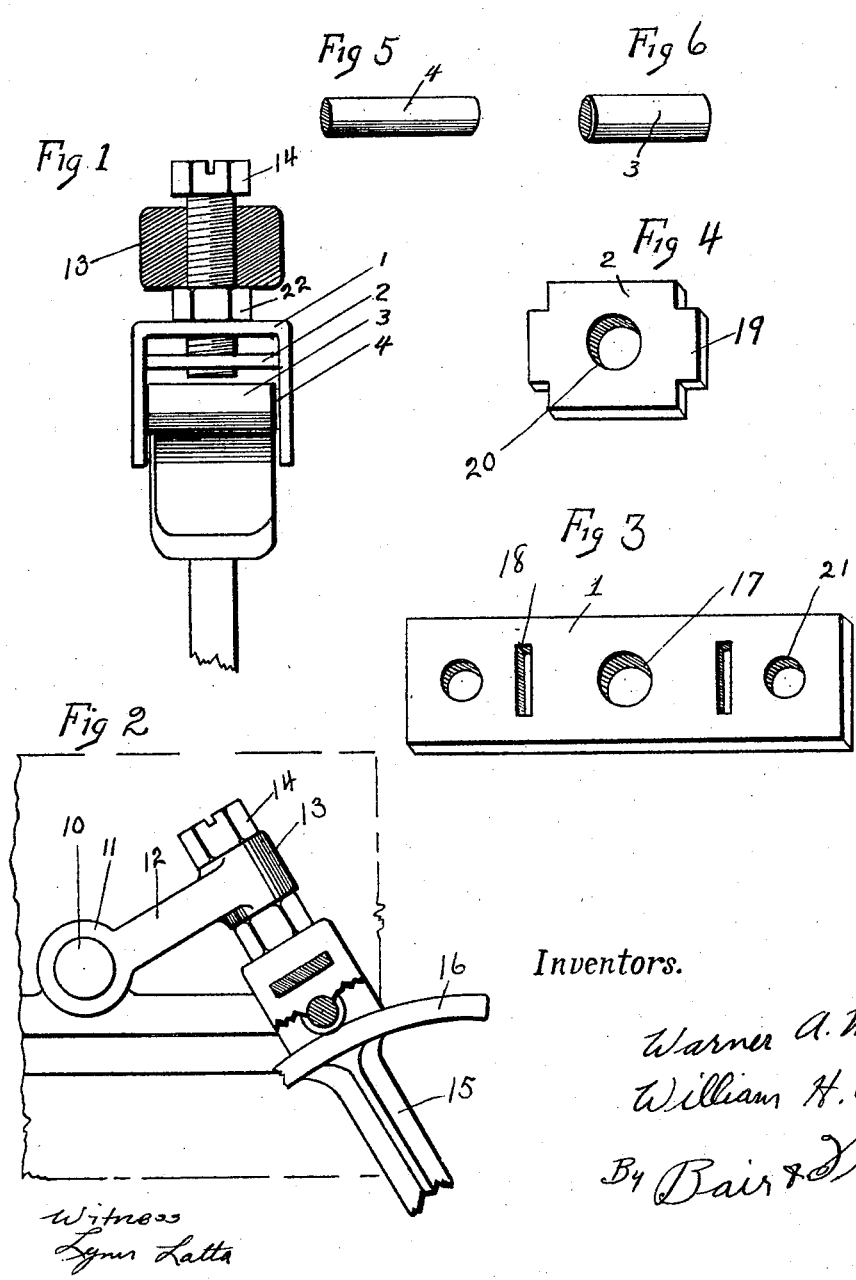
Inventors.
Warner A. Madison
William H. Dunelor
By Bair & Freeman
Attys Patented Jan. 8, 1924.

1,480,088

UNITED STATES PATENT OFFICE.

WARNER A. MADISON AND WILLIAM HARRY DUNSTON, OF DES MOINES, IOWA.

ANTIWEAR DEVICE FOR CONTROLLING LEVERS.

Application filed February 19, 1923. Serial No. 619,869.

*To all whom it may concern:*

Be it known that we, WARNER A. MADISON and WILLIAM HARRY DUNSTON, citizens of the United States, and residents of Des Moines, in the county of Polk and State of Iowa, have invented a certain new and useful Antiwear Device for Controlling Levers, of which the following is a specification.

The object of our invention is to provide an anti-wear device.

More particularly, it is our object to provide in combination with certain controlling lever structures, an anti-wear device, which insures the proper action of the controlling lever mechanism with a minimum of wear on the parts.

With these and other objects in view, our invention consists in the construction, arrangement and combination of the various parts of our device, whereby the objects contemplated are attained, as hereinafter more fully set forth, pointed out in our claims, and illustrated in the accompanying drawings, in which:

Figure 1 shows a front elevation of the anti-wear device assembled in proper relation with certain parts of the controlling lever structure.

Figure 2 shows a side elevation of the same.

Figure 3 shows a perspective view of the blank from which a portion of the anti-wear device is made.

Figure 4 shows a perspective view of another part of the anti-wear device.

Figure 5 shows a perspective view of the spindle of the anti-wear device; and

Figure 6 shows a perspective view of the sleeve of the anti-wear device.

In the Ford automobile there is provided the clutch control shaft indicated in the accompanying drawings by the reference numeral 10.

On the shaft 10 is a sleeve 11 from which projects an arm 12, which forms a bearing 13, for a screw-threaded bolt 14.

The bolt and the bearing 13 preferably have a screw-threaded connection.

A rocker arm 15 is connected with a hand control lever by a mechanism not here shown, and has on one end a curved cam 16.

Heretofore it has been the custom to let the lower end of the bolt 14 bear on the upper surface of the cam 16. The bolt repeatedly wears the cam and in the course of time, the effectiveness of the clutch operating mechanism deteriorates.

It will be understood that as the arm 15 is rocked, the bolt 14 and arm 12 are raised or permitted to drop as the case may be, for thus rocking the shaft 10.

There is also in actual practice, some side play of the arm 15 with the result that there are times when the bolt slides off the cam 16, thus making the emergency brake, which is also operated from the parts just described, useless and leaving the car in gear.

We have provided our attachment, which does away with the undesirable factors hereinbefore mentioned.

Our improved anti-wear device comprises a yoke 1, having the form of an inverted U. The blank from which the yoke 1 is made is illustrated in Figure 3.

In the central member of the yoke is a screw-threaded opening 17 and spaced therefrom on opposite sides thereof are elongated openings 18.

In Figure 4, we have shown a cross plate or bar 2, having the tongues or extensions 19 at its ends, which in the assembled device are received in the openings 18. The cross plate 2 has a screw-threaded opening 20.

In the arms of the yoke 1 are holes 21, in which are received the ends of a spindle 4, as shown in Figure 5. On the spindle 4 between the arms of the yoke 1 is a sleeve 3.

The anti-wear device is mounted on the bolt 14 with the bolt received in the screw-threaded openings 17 and 20.

It will be seen that the sleeve 3 then forms a roller, which will ride on the cam 16 when the arms of the yoke receive the cam 16 between them, so that the cam can not slide laterally.

The bolt can be adjusted in the member 13 and, of course, can be adjusted with relation to the anti-wear device.

Between the yoke 1 and the member 13 is an adjusting nut or lock nut 22.

Where our device is used, there is no danger of the cam 16 sliding laterally with relation to the bolt so as to render the device inoperative, and it is also obvious that the sleeve 3 forms a roller, which travels on the entire face of the cam 16 from side to side, so that the wear on the parts is reduced to a minimum.

Where this structure is used, the trouble that arises because of the bolt 14 wearing a groove in the cam 16 is entirely avoided, and we not only do away with the necessity for frictional adjustments, but also reduce the likelihood of serious accidents.

Some changes may be made in the details of the construction and arrangement of the device without departing from the real spirit and purpose of our invention, and it is our intention to cover by our claims, any modified forms of structure, which may be reasonably included within their scope.

We claim as our invention:

1. The combination of a movable bolt supporting arm, a rocker arm adjacent thereto having a cam plate thereon, with a device supported on said bolt comprising a yoke having a cross member on the bolt and a pair of spaced arms arranged on opposite sides of said plate, a cross brace between said arms mounted on the bolt, said cross member and cross brace and bolt having screw-threaded connection for adjustment, a spindle between said arms bearing on said cam plate.

2. The combination of a movable bolt supporting arm, a rocker arm adjacent thereto having a cross plate thereon, with a device supported on said bolt comprising a yoke having a cross member on the bolt and a pair of spaced arms arranged on opposite sides of said plate, a cross brace between said arms mounted on the bolt, said cross member and cross brace and bolt having screw-threaded connection for adjustment, and a rotary device between said arms bearing on said cam plate.

3. In a device of the class described, a yoke having a central member and spaced arms and having a cross member between its arms spaced from its closed end, said closed end and cross member being provided with openings for mounting on a support, a spindle supported between said arms, and a roller on said spindle.

Des Moines, Iowa, February 9, 1923.

WARNER A. MADISON.
WILLIAM HARRY DUNSTON.